United States Patent
Jain et al.

(10) Patent No.: US 9,286,025 B2
(45) Date of Patent: Mar. 15, 2016

(54) INTERACTIVE RENDERING ON A MULTI-DISPLAY DEVICE

(71) Applicant: POLARIS FINANCIAL TECHNOLOGY LTD., Chennai (IN)

(72) Inventors: Arun Jain, Chennai (IN); Rajesh Kuppuswamy, Chennai (IN); Appala Narasimha Sarma Karra, Chennai (IN)

(73) Assignee: Polaris Financial Technology Ltd., Selai, Chennai (IN)

( * ) Notice: Subject to any disclaimer, the term of this patent is extended or adjusted under 35 U.S.C. 154(b) by 49 days.

(21) Appl. No.: 14/220,934

(22) Filed: Mar. 20, 2014

(65) Prior Publication Data

US 2014/0285399 A1 Sep. 25, 2014

(30) Foreign Application Priority Data

Mar. 21, 2013 (IN) ............................ 1247/CHE/2013

(51) Int. Cl.
*G06F 3/14* (2006.01)

(52) U.S. Cl.
CPC ............ *G06F 3/1423* (2013.01); *G06F 3/1446* (2013.01); *G09G 2354/00* (2013.01)

(58) Field of Classification Search
None
See application file for complete search history.

(56) References Cited

U.S. PATENT DOCUMENTS

| | | | |
|---|---|---|---|
| 2002/0196196 A1* | 12/2002 | Gillespie et al. | 345/1.1 |
| 2010/0245256 A1* | 9/2010 | Estrada et al. | 345/173 |
| 2011/0115874 A1* | 5/2011 | Chang | H04N 7/147 348/14.02 |
| 2012/0280898 A1* | 11/2012 | Lucero et al. | 345/156 |
| 2014/0104082 A1* | 4/2014 | Nakamura | G06F 1/3212 340/995.15 |

\* cited by examiner

*Primary Examiner* — Joseph Feild
*Assistant Examiner* — Emily Frank
(74) *Attorney, Agent, or Firm* — Workman Nydegger

(57) ABSTRACT

Methods for rendering content on a multi-display device interactively are described. In one implementation, a request for rendering the content data on the multi-display device is received, wherein the content data includes presentation slides. Further, screen information including a number of available screens on the multi-display device and location information of the available screens is determined using a device driver. Also, a rendering pattern for rendering the content data on one or more of the available screens is received and the content data is provided, based on the screen information and the rendering pattern, to the device driver for rendering the content data on the one or more of the available screens of the multi-display device.

20 Claims, 5 Drawing Sheets

Order of movement of slides across screens →

|  | Column 1 | Column 2 | Column 3 | Column 4 | Column 5 | Column 6 | Column 7 | Column 8 | Column 9 |
|---|---|---|---|---|---|---|---|---|---|
| Screen 1 | 1 | 1 | 1 | 1 | 1 | 1 | 1 | 1 | 1 |
| Screen2 | 2 | 2 | 2 | 2 | 2 | 2 | 2 | 2 | 2 |
| Screen3 | 3 | 3 | 3 | 3 | 3 | 3 | 3 | 3 | 3 |
| Screen 4 | 4 | 4 | 4 | 4 | 4 | 4 | 4 | 4 | 4 |
| Screen 5 | 5 | 5 | 5 | 5 | 5 | 5 | 5 | 5 | 5 |
| Screen 6 | 6 | 6 | 6 | 6 | 6 | 6 | 6 | 6 | 6 |
| Screen 7 | 7 | 7 | 7 | 7 | 7 | 7 | 7 | 7 | 7 |
| Screen 8 | 8 | 8 | 8 | 8 | 8 | 8 | 8 | 8 | 8 |
| Screen 9 | 9 | 9 | 9 | 9 | 9 | 9 | 9 | 9 | 9 |

| Pin On Screen 1 | Pin On Screen 2 | Pin On Screen 3 | Pin On Screen 4 | Pin On Screen 5 | Pin On Screen 6 | Pin On Screen 7 | Pin On Screen 8 | Pin On Screen 9 | Close | Close All |

| | | |
|---|---|---|
| Slide 1 | Blank | Slide 10 |
| Slide 2 | Main Presentation | Slide 11 |
| Blank | Blank | Other Content 1 |

Fig. 2(d)

INTERACTIVE RENDERING ON A MULTI-DISPLAY DEVICE

CROSS-REFERENCE TO RELATED APPLICATIONS

This application claims priority to and the benefit of Indian Patent Application No. 1247/CHE/2013, entitled "Interactive Rendering on a Multi-Display Device", filed Mar. 21, 2013, which is incorporated by reference herein in its entirety.

TECHNICAL FIELD

The present subject matter relates, in general, to content rendering and, in particular, to a system and a method for rendering content on a multi-display device.

BACKGROUND

Meeting environments, such as conference rooms, executive briefing centers, and exhibition spaces, are now commonly equipped with display devices, such as liquid crystal display panels, plasma panels, and projectors. Users in these environments may use such display devices to display information to audience members. For example, a user may connect a computer's video output to a projector or a liquid crystal display panel, so that a computer generated content, such as slide show can be shown on a screen.

SUMMARY

This summary is provided to introduce concepts related to rendering on a multi-display device. The concepts are further described below in the detailed description. This summary is not intended to identify essential features of the subject matter nor is it intended for use in determining or limiting the scope of the subject matter.

In one implementation, a request for rendering the content data on the multi-display device is received, wherein the content data includes presentation slides. Further, screen information including a number of available screens on the multi-display device and location information of the available screens is determined using a device driver. Also, a rendering pattern for rendering the content data on one or more of the available screens is received and the content data is provided, based on the screen information and the rendering pattern, to the device driver for rendering the content data on the one or more of the available screens of the multi-display device.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

FIG. 2(a) illustrates an example pattern selection matrix, according to one embodiment of the present subject matter;

FIG. 2(c) illustrates an example pattern selection bar;

FIG. 2(d) illustrates an example slide display pattern on a multi-display device, in accordance with an embodiment of the present subject matter.

Figure 1:
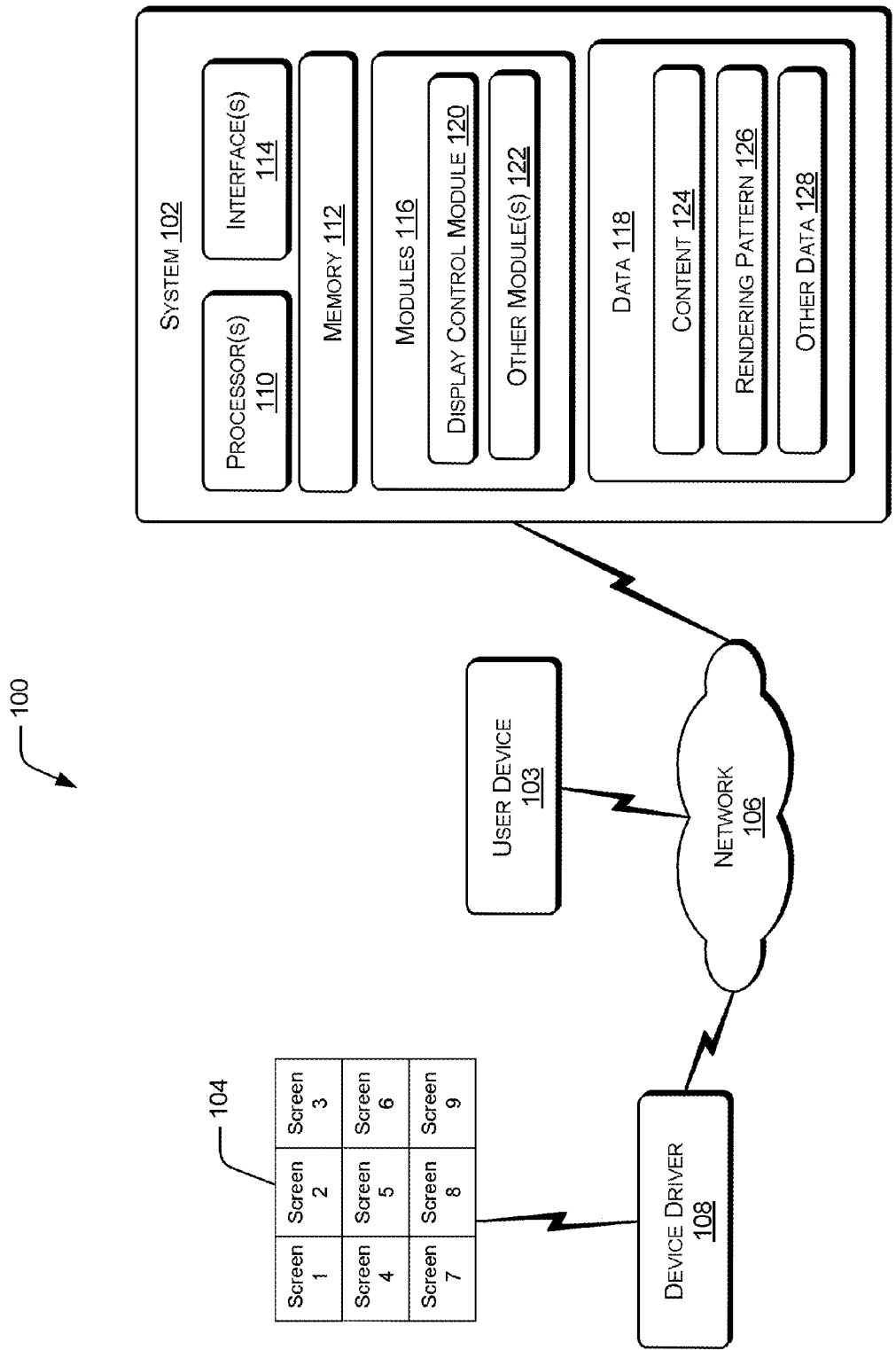
FIG. 1 illustrates a network environment implementing a content rendering system, in accordance with an embodiment of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

DETAILED DESCRIPTION

Conventionally, meeting environments, such as conference rooms, executive briefing centers, and exhibition spaces, employ display devices, such as liquid crystal display panels, plasma panels, and projectors, for rendering content, such as presentations, to the audience. A user typically connects the video output of his user device, such as a computer, to a projector or a liquid crystal display panel, so that the presentation content can be shown on a screen. During the presentation, the user may take the audience through a series of slides. Often, the users may need to toggle between the slides, refer to previous slides or compare the slides to provide the audience a better understanding of the content. Frequent switching between the slides is quite annoying for the audience and usually distracts the audience from the presentation. Such a conventional method of rendering the content on the liquid crystal panels, plasma panels, projectors, etc., is also non-interactive apart from failing to maintain the focus of the audience.

In accordance with the present subject matter, systems and methods for rendering content on a multi-display device are described. In the context of the present subject matter, the term multi-display device refers to a single display device having a combination of displays/screens, such as a liquid crystal display (LCD) wall matrix. Further, the term multi-display device also refers to a combination of individual display devices, such as monitors placed in proximity to each other and connected to a common computing device, such as desktop or a laptop, via a multi-display adaptor. Additionally, it can also refer to a single screen divided into multiple screen areas.

According to one embodiment, a request for rendering the content on a multi-display device is received from a user, such as a presenter, by the system. Upon receiving the request, the number of displays that are available for use on the multi-display device are determined. As mentioned above, the multi-display device comprises a plurality of displays. However, all the displays of the multi-display device may not be operative at a particular instance of time. Therefore, the number of displays that are available or operative is determined when a request for rendering the content arrives. Subsequently, corresponding location information, such as corner coordinates and centroid of each individual display is determined.

Thereafter, content to be rendered is obtained from the user. The content may be in the form of image or video frames. The content, according to one implementation, may include presentation slides. Further, a rendering pattern is obtained from the user. The rendering pattern is indicative of the displays selected for rendering from amongst the available displays, and path of movement of the content on the selected displays. According to one implementation, a pattern selection matrix can be provided to the user on a graphical user interface, enabling the user to specify the rendering pattern. The user may specify the rendering pattern using the pattern selection matrix.

Based on the rendering pattern, the display availability and the location information, the content is rendered onto the multi-display device. The content will be presented in the manner as specified by the user in the rendering pattern. In one implementation, the user may choose some of the displays from the available displays for rendering the content, while, utilizing the remaining displays for other purposes, such as video conferencing, opening a web browser, etc. Thus, the users are provided with the flexibility to customize and control the display according to their needs or requirements. Users may choose to temporarily hold or lock the slides or frequently referred slides on the individual displays so that the chosen slides will remain in front of the audience, thereby eliminating distraction to the audience caused due to frequent switching, comparison, and reference to the slides. This enhances the overall experience of presentation, and the user can convey complex knowledge to audience members in an interactive and easy to follow manner.

The following disclosure describes the method and the system for content rendering on a multi-display device. While aspects of the described method and the system can be implemented in any number of different computing systems, environments, and/or configurations, embodiments for the content rendering on a multi-display device are described in the context of the following example method(s) and system(s).

FIG. 1 illustrates a network environment 100 implementing a content rendering system 102, in accordance with an embodiment of the present subject matter.

In one implementation, the network environment 100 can be a public network environment, including thousands of personal computers, laptops, various servers, such as blade servers, and other computing devices. In another implementation, the network environment 100 can be a private network environment with a limited number of computing devices, such as personal computers, servers, laptops, and/or communication devices, such as mobile phones and smart phones.

The content rendering system 102 (hereinafter referred to as system 102) is communicatively connected to a multi-display device 104, through a device driver 108, and a network 106. The system 102 can be implemented in a variety of computing devices, including, servers, a desktop personal computer, a notebook or portable computer, a workstation, a mainframe computer, and a laptop. Further, in one implementation, the system 102 may be a distributed or centralized network system in which different computing devices may host one or more of the hardware or software components of the system 102.

As mentioned above, the multi-display device 104 may be a LCD wall matrix with multiple LCD screens. In one example, the multi-display device 104 may have 9 screens, such as screen 1, 2, . . . 9, shown as being placed adjacent to each other in a 3×3 matrix. In other examples, the number of screens can vary and be, for example, 16 screens placed as 4×4 matrix or 24 screens placed as 4×6 matrix or 8 screens placed as 4×2 matrix or any other number. In another example, the multi-display device 104 may have multiple monitors placed in proximity with each other, but not necessarily abutting each other. In yet another example, the multiple screens may be part of a single large LCD screen divided or split into multiple parts forming the multiple screens. Further, in the various implementations, the multiple screens need not abut or be adjacent screens and there can be gaps provided, for example, between different rows and/or columns. The multiple screens can also be of different sizes and/or shapes. Also, it will be understood that the matrix arrangement is one example arrangement and the screens can be arranged in different ways, such as in a single row or forming a curve or any other geometrical or non-geometrical formation as will be appreciated by a person skilled in the art.

The network 106 may be a wireless network, a wired network, or a combination thereof. The network 106 can also be an individual network or a collection of many such individual networks, interconnected with each other and functioning as a single large network, e.g., the Internet or an intranet. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), etc., to communicate with each other.

The system 102 can include processor(s) 110, memory 112, interface(s) 114, modules 116 and data 118. The processor 110 can be a single processing unit or a number of units, all of which could include multiple computing units. The processor 110 may be implemented as one or more microprocessors, microcomputers, microcontrollers, digital signal processors, central processing units, state machines, logic circuitries, and/or any devices that manipulate signals based on operational instructions. Among other capabilities, the processor 110 is configured to fetch and execute computer-readable instructions and data stored in the memory 112 and modules 116. The memory 112 may include any non-transitory computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. Further, the interfaces 114 may include a variety of software and hardware interfaces, for example, interfaces for peripheral device (s), such as a keyboard, a mouse, an external memory, and a printer. Further, the interfaces 114 may enable the system 102 to communicate with other devices, such as a user device 103 and the device driver 108 over the network 106.

The modules 116, amongst other things, include routines, programs, objects, components, data structures, etc., which perform particular tasks or implement particular abstract data types. The data 118 serves, amongst other things, as a repository for storing data processed, received and generated by one or more of the modules 116. The modules 116 further include, for example, a display control module 120 and other module (s) 122. The other modules 122 may include programs that supplement applications on the system 102, for example, programs in the operating system. The data 118 includes data received or generated for the execution of one or more modules 116 and include, for example, content 124, rendering pattern 126, and other data 128. The other data 128 can include data that supplements operation of the modules 116.

According to an embodiment of the present subject matter, the display control module 120 of the system 102 receives a request for rendering content from the user device 103 from a user, such as a presenter. The user device 103 may be any computing device, such as a personal computer, a laptop, a tablet, a mobile device, a smart phone and the like. While the user device 103 has been shown separate from the system 102, in one implementation, the user device 103 may be integrated with the system 102. In one example, the content to be rendered may include presentation slides, such as MS PowerPoint presentation slides, OpenOffice Impress slides, Keynote slides, or the like, and other content, such as videos, images, web browser, software applications, webinar, video-conference, multimedia files, and the like. The other content may also be referred to as supplementary content.

On receiving the request, the display control module 120 may seek input from the user as to whether the user would like to customize the display of the slides and may provide various customization options to the user. The display control module 120 may seek the user input and provide the customization options, for example, through a notification or a pop-up window on a graphical user interface (GUI) of the user device 103. In one implementation, the customization options may include an option of using a pre-selected pattern, also called as automated pattern, and an option of dynamic pattern selection, also called as manual pattern, for rending the content. In the pre-selected pattern option, the user can specify an automated rendering pattern prior to the initiation of the display of the slides in the presentation, while in the dynamic pattern selection option the user can specify or decide the content placement manually during the display of the slides in the presentation. Further, as a part of the customization options, the user can also specify whether any other content has to be displayed on one or more screens of the multi-display device 104 in addition to the presentation slides.

On receiving the selected customization option, the display control module 120 may communicate with the device driver 108 to determine screen information including the number of screens that are available for use on the multi-display device 104, and corresponding location information of the available screens. The location information for each screen can include one or more of coordinates of corners of the screen, centroid of the screen, and edges of the screen. It will be understood that references to screens in the present subject matter relate to screens of the multi-display device 104.

The device driver 108 can be a controller including hardware and software components for rendering content on the multi-display device 104. In one implementation, the device driver 108 can be a graphics card attached to a computing device connected to the multi-display device 104. In another implementation, the device driver 108 may be directly associated with a master display device amongst the multi-display device 104 and may drive the master display device and other slave display devices that are a part of the multi-display device 104.

If the automated pattern selection is selected by the user at the time of initiating the request, the display control module 120 generates and provides a pattern selection matrix to the user. The pattern selection matrix can be auto generated based on the number of screens in the multi-display device 104. For example, in case of 9 screens a 9×9 pattern selection matrix may be used, while in case of 16 screens a 16×16 pattern selection matrix may be used. Further, the pattern selection matrix may not always be a square matrix, but can be generated in different forms as may be evident to a person skilled in the art. Using the pattern selection matrix, the user can specify a path that the slides will take as the slides are changed, the screens on which the slides will be displayed, and the screens for display of other content. Accordingly, the display control module 120 can provide the slides and other content to the device driver 108 for rendering on the multi-display device 104. This will be discussed in detail with reference to FIGS. 2(*a*) and 2(*b*) later.

On the other hand, if the user opts for the manual or dynamic pattern selection, the display control module 120 provides the slides to the device driver 108 for rendering on the multi-display device 104 as per a default pattern. Further, the display control module 120 also provides a pattern selection bar on the multi-display device 104 and/or the graphical user interface of the user device 103. The user can then specify and dynamically modify the rendering pattern, during the presentation using the pattern selection bar. This will be discussed in detail with reference to FIGS. 2(*c*) and 2(*d*) later.

FIG. 2(*a*) illustrates an example pattern selection matrix 202 for automated pattern selection, and FIG. 2(*b*) illustrates an example slide movement pattern on a multi-display device as per the pattern matrix of FIG. 2(*a*). As shown in the FIG. 2(*a*), a 9×9 pattern selection matrix 202 is generated in accordance with 9 screens that are available on the multi-display device 104. The columns in the pattern selection matrix 202 indicate the order in which the slides would move, and the rows indicate the display number or screen of the multi-display device 104. The pattern selection matrix 202 is provided to the user device 103 by the display control module 120 for selecting movement or path of slides during the presentation. In one implementation, the display control module 120 may enable/disable certain selections based on the number of available display screens. For example, if the display 5 is not available, the display control module 120 makes the row 5 in the 9×9 matrix disabled. Thus, the user would not be able to make a selection at the row 5.

As shown in FIG. 2(*a*), in one example, the user can select the pattern 5→2→1→4→7→8 by selecting screen 5 in column 1, screen 2 in column 2, and so on in the first six columns of the matrix. In this example, the user may not select screens 3, 6, and 9 in any column. Similarly, the user may not select any screen in the columns 7, 8, and 9. Accordingly, as shown in FIG. 2(*b*), the display control module 120 treats screen 5 (selected in column 1 of FIG. 2(*a*)) as the main presentation screen on which the slides are presented and thus instructs the device driver 108 to display the main presentation slides on screen 5. When the user changes the slide in the main presentation, for example, from slide 1 to slide 2, the display control module 120 identifies the slide change input provided by the user device 103 and instructs the device driver 108 to move the display of the previously displayed slide(s) as per the pattern selected by the user. For example, for the first eight slides, each time the slides are changed, the slides are displayed on the screens, as shown in Table 1 below.

TABLE 1

Display of slides on screens based on automated pattern provided by user

| Slide Change No. | Slide 1 | Slide 2 | Slide 3 | Slide 4 | Slide 5 | Slide 6 | Slide 7 | Slide 8 |
|---|---|---|---|---|---|---|---|---|
| 0 (Start) | Screen 5 | Not Displayed | Not Displayed | Not Displayed | Not Displayed | Not Displayed | Not Displayed | Not Displayed |
| 1 | Screen 2 | Screen 5 | Not Displayed | Not Displayed | Not Displayed | Not Displayed | Not Displayed | Not Displayed |
| 2 | Screen 1 | Screen 2 | Screen 5 | Not Displayed | Not Displayed | Not Displayed | Not Displayed | Not Displayed |
| 3 | Screen 4 | Screen 1 | Screen 2 | Screen 5 | Not | Not | Not | Not |

TABLE 1-continued

Display of slides on screens based on automated pattern provided by user

| Slide Change No. | Slide 1 | Slide 2 | Slide 3 | Slide 4 | Slide 5 | Slide 6 | Slide 7 | Slide 8 |
|---|---|---|---|---|---|---|---|---|
| 4 | Screen 7 | Screen 4 | Screen 1 | Screen 2 | Displayed Screen 5 | Displayed Not Displayed | Displayed Not Displayed | Displayed Not Displayed |
| 5 | Screen 8 | Screen 7 | Screen 4 | Screen 1 | Screen 2 | Displayed Screen 5 | Displayed Not Displayed | Displayed Not Displayed |
| 6 | Not Displayed | Screen 8 | Screen 7 | Screen 4 | Screen 1 | Screen 2 | Displayed Screen 5 | Displayed Not Displayed |
| 7 | Not Displayed | Not Displayed | Screen 8 | Screen 7 | Screen 4 | Screen 1 | Screen 2 | Screen 5 |

Figure 2B:
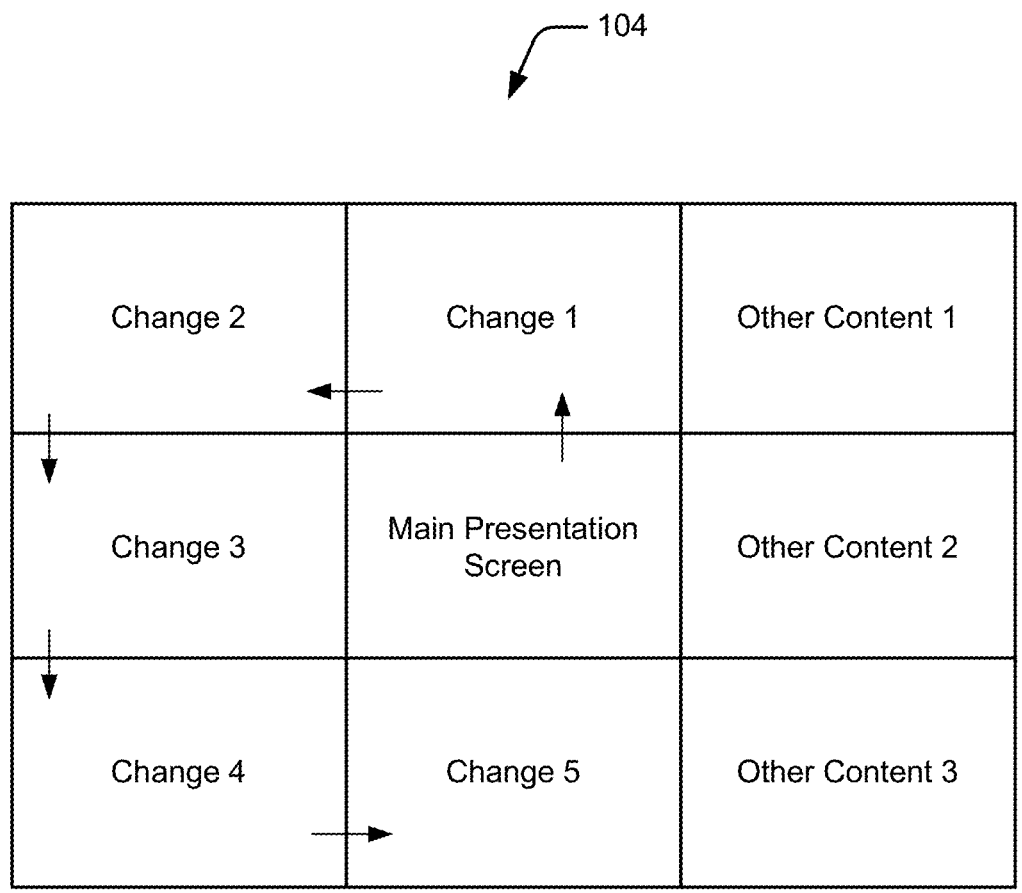
FIG. 2(b) illustrates an example slide movement pattern on a multi-display device as per the pattern matrix of FIG. 2(a)

Thus, as can be seen from table 1 and FIG. 2(b), the slides follow a path screen 5→2→1→4→7→8 and then are not displayed. While table 1 illustrates the pattern for the first 7 slides, this pattern or path of slide movement would continue for subsequent slides as well till the end of the presentation is reached. The pattern of slide movement may also be continuously used if the presentation is run in a loop. Further, before instructing the device driver 108 to display a particular slide on a particular screen, the display control module 120 can also determine the area and resolution available for presentation on the particular screen based on the screen information it had received earlier. Accordingly, the display control module 120 can stretch or resize the slide for presentation on the particular screen. The display control module 120 can thus provide the resized slide to the device driver 108 for presentation on the particular screen. For this, the display control module 120 can use methods in the art for resizing content based on screen area and resolution.

For example, the content to be rendered and the rendering pattern as obtained from the user can be saved as content 124 and rendering pattern 126 in data 118 of the system 102. For rendering, the display control module 120 utilizes the display availability information, and location information of the corresponding screen to push the content onto the screens of the multi-display device 104 according to the rendering pattern 126. As stated above, the location information may include corner coordinates and possibly the centroid of the displays. In one implementation, the display control module 120 may communicate with the authorizing/presentation tool API, for example, a PowerPoint API in case the presentation tool is PowerPoint, and other software frameworks for rendering the content.

As mentioned above, the rendering process may involve content processing. As indicated previously, the content may be in the form of frames. Therefore, size or dimension of such frames may not always fit to the selected displays. Therefore, the display control module 120, in accordance with one implementation of the present subject matter, is be configured to determine the dimensions of the frame and adjust the dimensions of the frame to align the frame with the displays.

Further, the screens 3, 6, and 9, which were not selected in the pattern by the user as depicted in FIG. 2(a), can be used by the user for displaying other content, such as other content 1-3 or may be left blank. The other content or supplementary content data may be a separate video file, an image file, a multimedia file, a web browser, etc. For receiving user inputs for the other content, the display control module 120 can provide a GUI to the user device 103 to select the file or content to be rendered in each of the unused screens. Further, as before, the display control module 120 can also resize the other content based on the screen information of the unused screen on which it is to be displayed. The user can also change the other content, while the presentation is being displayed, through the GUI on the user device 103. Thus, the presentation of slides becomes more interactive, informative and the system 102 is able to efficiently handle multiple screens and multiple content types for rendering on the multiple screens.

It will be understood that the pattern described with reference to FIGS. 2(a) and 2(b) is only for the purpose of explanation, and it should not be construed as a limitation. Different types of patterns can be selected by the user. Further, the pattern selection matrix can also be of different types and can be displayed in different forms. For example, the rows and columns can be interchanged. In another example, a single row may be provided and the user may be asked to provide the screen numbers in the order of the pattern to be followed. In yet another example, a 3×3 matrix representing the screens of the multi-display device 104 can be displayed on the user device 103 and the user can select screens in the order in which the slides would move, thereby forming the pattern. Other ways of receiving the automated pattern selection from the user can also be used as would be evident from the present subject matter.

FIG. 2(c) illustrates an example pattern selection bar 204 for manual pattern selection and FIG. 2(d) illustrates an example slide display pattern on a multi-display device, in accordance with an embodiment of the present subject matter. As shown in the FIG. 2(c), the pattern selection bar 204 depicts the display numbers of screens of the multi-display device 104 that are available. In case any screen is not available, the corresponding button may not be displayed or may not be activated for selection. The user may use the pattern selection bar 204 to manually pin a slide or other content to the desired display screen during the presentation. For example, the main presentation may be displayed on screen 5, the central screen, by default. Further, while changing the slides, in case the user wants to pin slide 1 on screen 1 to refer to it while discussing a subsequent slide, the user may select slide 1 and select the button on the bar that reads "pin on screen 1". Accordingly, the display control module 120 receives an input that the user would like to pin slide 1 on screen 1 and the display control module 120 can provide instructions to the device driver 108 for rendering slide 1 on screen 1. As mentioned earlier, while pushing content to be displayed on a particular slide, the display control module 120 can determine screen information and resize the content based on the screen information. Also, the content to be rendered and pattern selected by the user can be saved in the content 124 and the rendering pattern 126 respectively. The user can also pin content other than slides, such as the other content described above, onto one or more screens or can leave one or more screens blank.

For example, FIG. 2(d) illustrates a multi-display device 104 where the user has pinned slide 1 on screen 1, slide 2 on screen 4, slide 10 on screen 3, and slide 11 on screen 6. Further, the main presentation is displayed on screen 5 while the screens 2, 7, and 8 are left blank. At the same time, screen 9 is used to display other content. Thus, the overall interactive nature of the presentation can be enhanced and at the same time the system 102 can efficiently control the rendering of different content types on different screens of the multi-display device.

Figure 3:
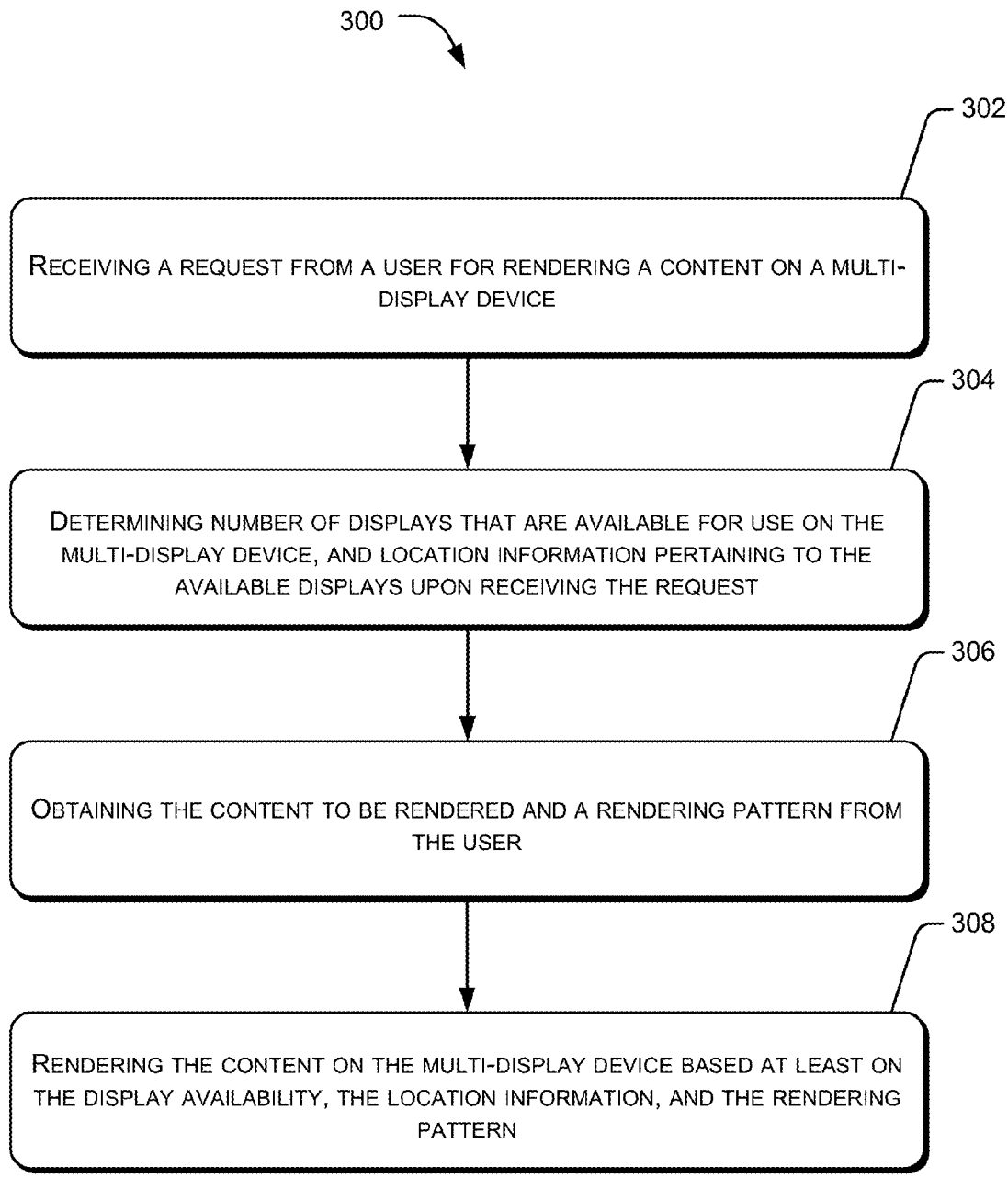
FIG. 3 illustrates a method for rendering content on the multi-display device, in accordance with an implementation of the present subject matter.

FIG. 3 illustrates a method 300 for rendering content on a multi-display device 104, in accordance with an implementation of the present subject matter.

The method 300 may be implemented in a variety of computing systems, in several different ways. For example, the method 300, completely or partially, may be described in the general context of computer executable instructions. Generally, computer executable instructions can include routines, programs, objects, components, data structures, procedures, modules, functions, etc., that perform particular functions or implement particular abstract data types. A person skilled in the art will readily recognize that steps of the method can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of the described method.

The order in which the method 300 is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the methods can be implemented in any suitable hardware, software, firmware, or combination thereof.

The method 300 is initiated at block 302 where a request for rendering content on a multi-display device is received from a user. The multi-display device refers to a single display device having a combination of displays/screens, such as a liquid crystal display (LCD) wall matrix. Further, the term multi-display device also refers to a combination of individual display devices, such as monitors placed in proximity to each other and connected to a common computing device, such as desktop or a laptop, via a multi-display adaptor. According to one implementation, the display control module 120 within the system 102 receives the request for rendering content from the user.

At block 304, number of displays that are available for use on the multi-display device, and corresponding location information of the available displays is determined. The multi-display device may have a plurality of displays. However, in certain cases, all the displays of the multi-display device may not be available for use. For example, if one of the displays is damaged, said display may not be available for use. Accordingly, information related to number of available displays and corresponding location information, such as corner coordinates is determined. According to one implementation, the display control module 120 determines the available displays and location information of those displays from a device driver 108. The display control module 120, for example, communicates with the device driver 108 of the multi-display device 104 to gather the screen information.

At block 306, the content to be rendered and its rendering pattern is obtained from the user. The content may be in the form of image frames or video frames. According to one implementation, the content may include presentation slides. The rendering pattern is indicative of the displays selected for rendering from amongst the available displays. Further, the rendering pattern can be indicative of the path of movement of the content on the selected display in case of a pre-selected pattern or the rendering pattern can be indicative of which content is to be pinned to which screen in case of dynamic pattern. According to one implementation, the display control module 120 is configured to provide a pattern selection matrix or a pattern selection bar to the user on a graphical user interface of a user device 103, enabling the user to specify the rendering pattern. The user specified rendering pattern is obtained by the display control module 120 and saved in the rendering pattern 126. Further, the content can also be specified by the user from amongst the presentation slides and other content and is saved in the content 124.

At block 308, the content is rendered on the multi-display device based on the content, display availability, the location information, and the rendering pattern obtained from the user. As described previously, the rendering pattern indicates the displays selected by the user and/or path of movement of the content on the selected displays. The display control module 120, according to one implementation, renders the content on the multi-display device 104 according to the rendering pattern. In one implementation, the user may choose some of the displays from the available displays for rendering the content. The remaining displays can be utilized for any other purposes by the user. As an instance, the user may choose 6 out of 8 available displays for rendering the presentation slides and can use the remaining 1 display for opening a web browser, and another left over display for video conference. Thus, the users are provided with the flexibility to fully customize and control the display according to their needs or requirements.

According to one implementation, the rendering process may involve content processing. As indicated previously, the content may be in the form of frames. Size or dimensions of such frames may not always fit to the selected displays. To this end, the display control module 120, in accordance with one implementation of the present subject matter, can be configured to identify the dimensions of the frame and adjust the dimensions of the frame to make it in-line with the dimensions of the display where the frame is to be displayed. To adjust the dimensions, the display control module 120 may utilize the location information of the display. The content processing may further involve noise filtering, image enhancement, etc.

Although embodiments of content rendering in a multi-display device have been described in language specific to structural features and/or methods, it is to be understood that the specific features or methods described are only example implementations of the present subject matter.

We claim:

1. A method of interactive rendering of content data on a multi-display device, the method comprising:
    receiving, at a content rendering system communicatively coupled to the multi-display device through a device driver and a computer network, a request for rendering the content data on the multi-display device from a user device communicatively coupled to the content rendering system through a network, wherein the content data comprises presentation slides;
    in response to receiving the request, providing, through a display control module executing on the content rendering system, a display customization option on a Graphical User Interface (GUI) of the user device, the display customization option comprising a pre-selected pattern and a dynamic pattern, the pre-selected pattern enabling specification of an automated rendering pattern prior to initiation of display of the content data on the multi-display device, and the dynamic pattern enabling specification of placement of the content data during the display thereof on the multi-display device;

in response to receiving a selection of one of: the pre-selected pattern and the dynamic pattern from the user device, determining, through the device driver, screen information including a number of available screens on the multi-display device and location information of the available screens, the location information for each available screen comprising coordinates of corners of the each available screen, a centroid of the each available screen and edges of the each available screen;

providing, through the display control module, a capability to the user device to select supplementary content relevant to the content data also in response to receiving the selection of the one of: the pre-selected pattern and the dynamic pattern;

rendering, through the device driver and the display control module, the content data on at least a plurality of available screens of the multi-display device based on the determined screen information and the selected customization option, and the supplementary content relevant to the content data on at least one unselected screen of the number of available screens, thereby providing for an interactive presentation of the content data;

determining, through the display control module, available area and resolution of each of the at least plurality of available screens on which the content data is to be rendered; and resizing, through the display control module, the content data relevant to at least one screen of the at least plurality of available screens in accordance with the determined available area and resolution.

2. The method of claim 1, further comprising providing, through the display control module, a pattern selection matrix based on the number of available screens on the multi-display device to the user device in response to the reception of the selection of the pre-selected pattern.

3. The method of claim 2, further comprising:
receiving, through the content rendering system, a selected path of movement of the presentation slides as a rendering pattern from the user device in accordance with the provided pattern selection matrix.

4. The method of claim 1, wherein, when the selected customization option is the dynamic pattern, the method further comprises:
providing, to the device driver, the presentation slides based on a default rendering pattern;
providing, to the user device, a pattern selection bar for receiving the dynamic pattern as the rendering pattern while the presentation slides are being rendered, wherein the dynamic pattern includes pinning one or more slides on available screens selected through the pattern selection bar; and
providing the presentation slides to the device driver based on the dynamic pattern for rendering.

5. The method of claim 1, wherein the supplementary content comprises at least one of: a video file, an image file, web browser data, and a multimedia file.

6. The method of claim 1, comprising implementing the device driver as a graphics card attached to a computing device coupled to the multi-display device.

7. The method of claim 1, wherein the multi-display device comprises a single screen split into multiple parts.

8. A content rendering system for interactively rendering content data on a multi-display device, the content rendering system comprising:
a memory; and
a processor communicatively coupled to the memory, the processor being configured to execute a display control module to:
receive a request for rendering the content data on the multi-display device from a user device communicatively coupled to the content rendering system through a network, wherein the content data comprises presentation slides, and wherein the multi-display device is communicatively coupled to the content rendering system through a device driver and the network,
in response to receiving the request, provide a display customization option on a GUI of the user device, the display customization option comprising a pre-selected pattern and a dynamic pattern, the pre-selected pattern enabling specification of an automated rendering pattern prior to initiation of display of the content data on the multi-display device, and the dynamic pattern enabling specification of placement of the content data during the display thereof on the multi-display device,
in response to receiving a selection of one of: the pre-selected pattern and the dynamic pattern from the user device, determine, in conjunction with the device driver, screen information including a number of available screens on the multi-display device and location information of the available screens, the location information for each available screen comprising coordinates of corners of the each available screen, a centroid of the each available screen and edges of the each available screen,
provide a capability to the user device to select supplementary content relevant to the content data also in response to receiving the selection of the one of: the pre-selected pattern and the dynamic pattern,
render, in conjunction with the device driver, the content data on at least a plurality of available screens of the multi-display device based on the determined screen information and the selected customization option, and the supplementary content relevant to the content data on at least one unselected screen of the number of available screens, thereby providing for an interactive presentation of the content data,
determine available area and resolution of each of the at least plurality of available screens on which the content data is to be rendered, and
resize the content data relevant to at least one screen of the plurality of available screens in accordance with the determined available area and resolution.

9. The content rendering system of claim 8, wherein, when the selected customization option is the pre-selected pattern, the processor is further configured to execute the display control module to:
provide a pattern selection matrix to the user device for selection of a path of movement of the presentation slides,
receive a selected path of movement as a rendering pattern in accordance with the provided pattern selection matrix.

10. The content rendering system of claim 8, wherein, when the selected customization option is the dynamic pattern, the processor is further configured to execute the display control module to:

provide the presentation slides to the device driver based on a default rendering pattern, provide a pattern selection bar to the user device for receiving the dynamic pattern as the rendering pattern while the presentation slides are being rendered, wherein the dynamic pattern includes pinning one or more slides on available screens selected through the pattern selection bar, and provide the presentation slides to the device driver based on the dynamic pattern for rendering.

11. The content rendering system of claim 8, wherein the supplementary content comprises at least one of: a video file, an image file, web browser data, and a multimedia file.

12. The content rendering system of claim 8, wherein the device driver is implemented as a graphics card attached to a computing device coupled to the multi-display device.

13. The content rendering system of claim 8, wherein the multi-display device comprises a single screen split into multiple parts.

14. A non-transitory computer-readable medium having embodied thereon instructions for executing interactive rendering of content data on a multi display device, the non-transitory computer-readable medium comprising instructions to:

receive, at a content rendering system communicatively coupled to the multi-display device through a device driver and a computer network, a request for rendering the content data on the multi-display device from a user device communicatively coupled to the content rendering system through a network, wherein the content data comprises presentation slides;

in response to receiving the request, provide, through a display control module executing on the content rendering system, a display customization option on a GUI of the user device, the display customization option comprising a pre-selected pattern and a dynamic pattern, the pre-selected pattern enabling specification of an automated rendering pattern prior to initiation of display of the content data on the multi-display device, and the dynamic pattern enabling specification of placement of the content data during the display thereof on the multi-display device;

in response to receiving a selection of one of: the pre-selected pattern and the dynamic pattern from the user device, determine, through the device driver, screen information including a number of available screens on the multi-display device and location information of the available screens, the location information for each available screen comprising coordinates of corners of the each available screen, a centroid of the each available screen and edges of the each available screen;

provide through the display control module a capability to the user device to select supplementary content relevant to the content data also in response to receiving the selection of the one of: the pre-selected pattern and the dynamic pattern;

render, through the device driver and the display control module, the content data on at least a plurality of available screens of the multi-display device based on the determined screen information and the selected customization option, and the supplementary content relevant to the content data on at least one unselected screen of the number of available screens, thereby providing for an interactive presentation of the content data;

determine, through the display control module, available area and resolution of each of the at least plurality of available screens on which the content data is to be rendered; and resize, through the display control module, the content data relevant to at least one screen of the plurality of available screens in accordance with the determined available area and resolution.

15. The non-transitory computer-readable medium of claim 14, further comprising instructions to provide, through the display control module, a pattern selection matrix based on the number of available screens on the multi-display device to the user device in response to the reception of the selection of the pre-selected pattern.

16. The non-transitory computer-readable medium of claim 15, further comprising instructions to:

receive, through the content rendering system, a selected path of movement of the presentation slides as a rendering pattern from the user device in accordance with the provided pattern selection matrix.

17. The non-transitory computer-readable medium of claim 14, wherein, when the selected customization option is the dynamic pattern, the non-transitory computer-readable medium further comprises instructions to:

provide, to the device driver, the presentation slides based on a default rendering pattern;

provide, to the user device, a pattern selection bar for receiving the dynamic pattern as the rendering pattern while the presentation slides are being rendered, wherein the dynamic pattern includes pinning one or more slides on available screens selected through the pattern selection bar; and provide the presentation slides to the device driver based on the dynamic pattern for rendering.

18. The non-transitory computer-readable medium of claim 14, comprising instructions compatible with the supplementary content comprising at least one of: a video file, an image file, web browser data, and a multimedia file.

19. The non-transitory computer-readable medium of claim 14, comprising instructions compatible with the device driver implemented as a graphics card attached to a computing device coupled to the multi-display device.

20. The non-transitory computer-readable medium of claim 14, comprising instructions compatible with the multi-display device comprising a single screen split into multiple parts.

* * * * *